(12) United States Patent
Liu et al.

(10) Patent No.: US 12,499,484 B2
(45) Date of Patent: Dec. 16, 2025

(54) TECHNIQUES FOR IMPROVING THE ACCURACY OF AUTOMATED PREDICTIONS

(71) Applicant: LendingClub Bank, National Association, Lehi, UT (US)

(72) Inventors: Jianju Liu, Kentfield, CA (US); Dhwani Umeshbhai Bosamiya, Sunnyvale, CA (US); Jianglan Han, San Francisco, CA (US); Phani Pradeep Benarji Kommana, Pleasanton, CA (US); Shi Tang, San Bruno, CA (US)

(73) Assignee: LendingClub Bank, National Association, Lehi, UT (US)

( * ) Notice: Subject to any disclaimer, the term of this patent is extended or adjusted under 35 U.S.C. 154(b) by 0 days.

(21) Appl. No.: 18/239,633

(22) Filed: Aug. 29, 2023

(65) Prior Publication Data

US 2023/0410193 A1 Dec. 21, 2023

Related U.S. Application Data

(63) Continuation of application No. 16/835,650, filed on Mar. 31, 2020, now abandoned.

(51) Int. Cl.
*G06Q 40/03* (2023.01)
*G06N 5/022* (2023.01)

(52) U.S. Cl.
CPC ........... *G06Q 40/033* (2025.08); *G06N 5/022* (2013.01); *G06Q 40/03* (2023.01)

(58) Field of Classification Search
CPC ...... G06Q 40/025; G06Q 40/03; G06Q 40/33; G06N 3/08; G06N 5/022
USPC .......................................................... 705/38
See application file for complete search history.

(56) References Cited

U.S. PATENT DOCUMENTS

| | | |
|---|---|---|
| 2004/0260678 A1 | 12/2004 | Verbowski |
| 2006/0111949 A1 | 5/2006 | Krasnerman |
| 2011/0173116 A1 | 7/2011 | Yan |
| 2011/0251945 A1 | 10/2011 | Liao |
| 2011/0270779 A1 | 11/2011 | Showalter |
| 2013/0103569 A1 | 4/2013 | Gopinathan |

*Primary Examiner* — Lindsay M Maguire
(74) *Attorney, Agent, or Firm* — Invoke

(57) ABSTRACT

Techniques are provided for forming clusters of individual prediction targets (IPTs). An initial prediction target is a target for which an automated prediction has been generated. IPTs may be, for example, borrowers to which a lending entity has extended loans based on predictions generated by a credit policy. Each cluster includes (a) a "core" of underperforming entities (UEs), and (b) a set of boundary performant entities (PEs). The UEs that belong to the UE core of a cluster are "similarly situated" relative to the values of their features. For example, in the context where the IPTs are borrowers, the UEs at the core of a cluster may correspond to defaulting borrowers that had similar bureau data, lending entity data, and borrower data. The boundary performant entities of the cluster may be borrowers that have not defaulted, but had similar credit qualifications as the UEs of the cluster. Having formed these clusters, the clusters may be used in a variety of ways, including but not limited to improving the accuracy of the credit model, identifying potentially problematic future borrowers, generating visualizations that illustrate the relative importance of clusters of defaulting borrowers, etc.

20 Claims, 7 Drawing Sheets

```
Diff-Set selection:
To find the smallest set of parameters that can
differentiate the P and N in a given cluster.

Algorithm for blue forced scanning
For each cluster formed:
Create cache diff_set
For each dimensional (Bureau, LC, Borrower) parameter
set:
    #scan through in order
    For each parameter (i):
        create cache_PiP
        for each item in P dataset:
            add value into cache PiP
            min (cache_PiP, v)
            max(cache_PiP, v)
        mark (min,max) of cache_PiP
        create cache PiN
        Repeat for the N dataset
        compare cache_PiP and cache PiN
        if separated then add cache_PiP/N into the diff_set
```

FIG. 4

TECHNIQUES FOR IMPROVING THE ACCURACY OF AUTOMATED PREDICTIONS

BENEFIT CLAIM

This application claims the benefit as a continuation of application Ser. No. 16/835,650, filed Mar. 31, 2020, by Jianju Liu et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The present invention relates to automated predictions and, more specifically, to techniques for improving the accuracy of automated predictions.

BACKGROUND

The use of automated prediction mechanisms is widespread. For example, automated prediction mechanisms are often used to predict the weather, the outcome of sporting events, the performance of the stock market, etc. Such predictions are typically produced by executing complex algorithms and computer models. With advancements in artificial intelligence (AI) and related technologies, automated prediction mechanisms have been expanded to even more applications, such as predicting whether a person will keep a commitment, and whether a student is likely to stop coming to classes.

Unfortunately, even with state-of-the-art prediction technology, the predictions produced by automated prediction mechanisms are not always accurate. When predictions of an automated prediction mechanism are not accurate, it is desirable to modify the automated prediction mechanism to improve its accuracy. Each modification of an automated prediction mechanism effectively creates a new version of the automated prediction mechanism, where the goal is for each successive version to be more accurate than its predecessors. Unfortunately, making such modifications can be complicated and error prone.

For example, assume that an automated prediction mechanism is being used to predict the likelihood that a borrower will default on a loan. In this example, the "individual prediction targets" or "IPTs" to the automated prediction mechanism are potential borrowers. To make a prediction of the likelihood that a potential borrower will default on a loan, an automated prediction mechanism may take into account information about the potential borrower that comes from many sources. For example, the automated prediction mechanism of a lending entity may use (a) input data from credit bureaus, (b) input data from or derived by the lending entity, and (c) input data obtained directly from or about the borrower.

Examples of credit bureau data include:
The number of months since an account was charged off
Number of deduped inquiries in past 6 months (excluding auto and mortgage inquiries)
Number of currently active mortgage accounts
Number of trades
Ratio of total current balance to high credit/credit limit for all revolving accounts
Number of trades opened in past 12 months
Percentage of all trades opened in past 24 months to all trades Examples of data obtained or generated by a lending entity include:
% Balance on Bureau Unsecured Loans
total personal loan balance reported by a credit bureau
sum of current balances of all revolving trades
Average number of months since utility trades were opened including indeterminates
Total number of occurrences of 30-180 days delinquency in the last 24 months on utility trades excluding derogatory trades
Average number of months since student trades were opened including deferred trades or indeterminates
calculated predictions of likelihood of default (Generation 5 default prediction score "G5 score", and Early Delinquent Score (EDQ score))

Examples of data obtained from the prospective borrower include:
Borrower self-stated income
Borrower's initial request amount
Borrower's initial loan purpose
Monthly payment for the loan It should be noted that these are merely examples of the type of data that may be used as input to an automated prediction mechanism used by a lending entity. The actual number of distinct credit-bureau-originated input parameters and lending-institution-originated input parameters may number in the thousands.

For each potential borrower, the values of the input parameters for that borrower are fed into a lending entity's automated prediction mechanism. In the context of lending, the automated prediction mechanism is typically referred to as a credit policy. Based on the input values, the credit policy may determine which potential borrowers qualify for loans, and assign each borrower that qualifies for a loan to loan category. In some implementations, each category includes a pricing grade (A-G), and a term maturity (e.g. 36, 60, 24, 48 months. Thus, a borrower that is assigned to loan category A36 by the credit policy is deemed to qualify for a loan with pricing grade A and a loan maturity of 36 months. The lending entity then extends loans with terms based on the loan categories to which the respective borrowers were assigned, where each loan category is expected to have a particular Investor Return Rate (IRR).

Once predictions have been made by an automated prediction mechanism, it is possible to determine whether the predictions were accurate. The IPTs associated with inaccurate predictions are referred to herein as underperforming entities (UEs), while IPTs associated with accurate predictions are referred to herein as performant entities (PEs). In the context of lending, once loans have been extended, the lending entity may track the performance of the loans in each loan category. Tracking the performance of loans may involve, for example, identifying loan categories that are "under-performing". The criteria used to determine whether a loan category is "under-performing" may vary from implementation to implementation. For example, a loan category may be under-performing if the IRR for the loan category falls below the expected IRR for the loan category.

When a loan category is under-performing, it is usually because the loan category includes several loans for which the predictions were erroneous. The test for whether a prediction regarding a loan was erroneous may vary from implementation to implementation. For example, in one embodiment, the prediction for a loan is erroneous if the loan becomes 30+ days delinquent. In other implementations, the test may be whether the loan is 1+ days delinquent, or 60+ days delinquent. The techniques described herein are not limited to any particular test for determining whether the prediction associated with a loan was erroneous.

By tracking the performance of loans, the lending entity may encounter a situation in which a particular loan category (e.g. loans assigned category B36) exhibits lower-than-expected performance. For example, assume that the Investor Return Rate for loans in category B36 is expected to be a 5% annual return rate. If several loans in this category go delinquent, the actual IRR for the category will be less than expected. Under these circumstances, the loan category may be deemed to have an unsatisfactory IRR. For all loan categories that have unsatisfactory IRRs, the lending entity may make manually adjustments to create a new version of the automated prediction mechanism by adjusting the portion of the automated prediction mechanism that corresponds to that particular category of loans.

In the present example, if several loans that are associated with the B36 category are delinquent, then the lending entity may conclude that the B36 category has an unsatisfactory IRR. In response to this determination, the lending entity may attempt to make manual adjustments to improve and "fine tune" the automated prediction mechanism. For example, the lending entity may adjust the portion of a credit policy that is associated with the G5 and EDQ scores to raise the requirements of the underperforming B36 category. With the new version of the credit policy that incorporates these adjustments, future borrowers that previously would have fallen into the B36 category may fall into an inferior loan category. Because they fall into an inferior loan category, those future borrowers and may be denied loans, or extended loans that have less-favorable terms.

Unfortunately, modifying automated prediction mechanisms in this manner does not provide optimal results. For example, while it may be true that, as a whole, loan category B36 was under-performing, category B36 may also have included many loans that performed well (e.g. that never became delinquent). By modifying the automated prediction algorithm in a manner that penalizes all future borrowers that would have previously fallen into the B36 category, the automated prediction algorithm penalizes future borrowers that are situated similar to the borrowers whose B36 loans performed well.

BRIEF DESCRIPTION OF THE DRAWINGS

In the drawings:

FIG. 4 illustrates a technique for identifying the DIFF-SET of a cluster, and an example of a DIFF-SET that includes three variables with corresponding critical ranges;

DETAILED DESCRIPTION

Figure 1:
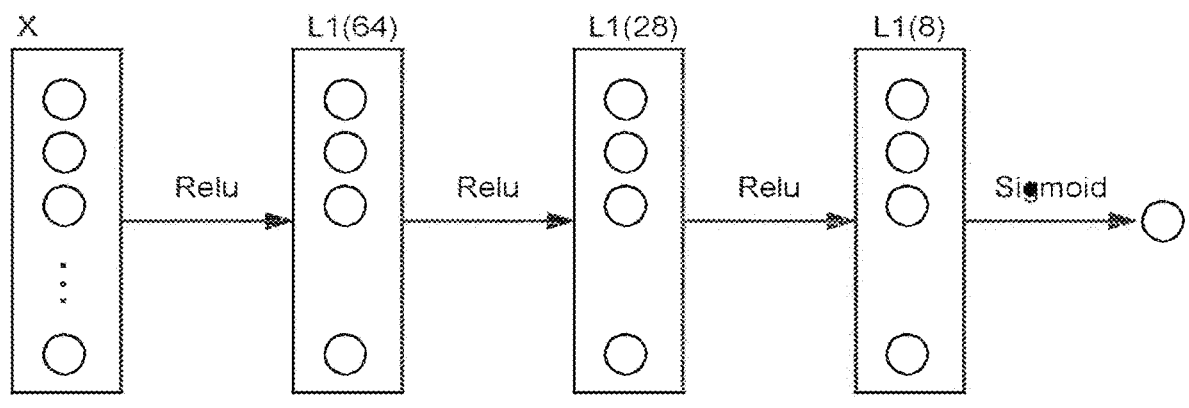
FIG. 1 illustrates a technique for identifying the performant entities (PEs) that are closest to underperforming entities (UEs) in a population.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As mentioned above, automated prediction mechanisms may group individual prediction targets (e.g. potential borrowers) into loan categories (e.g. A36, B60, etc). The performance of the individual prediction targets may then be tracked to identify underperforming categories. The automated prediction mechanisms may then be manually adjusted based on which categories have been identified as underperforming.

Unfortunately, adjusting automated prediction mechanisms in this manner provides less than optimal results because it fails to distinguish between those individual entities within a category that performed well ("PEs") and those individual entities within the same category that did not perform well ("UEs").

The techniques described herein are used to identify clusters of IPTs. Each cluster of includes (a) a "core" of UEs, and (b) a set of boundary PEs. The UEs that belong to the UE core of a cluster are "similarly situated" relative to the values of their features. For example, in the context where the IPTs are borrowers, the UEs at the core of a cluster may correspond to defaulting borrowers that had similar bureau data, lending entity data, and borrower data.

The PEs that belong to a cluster are PEs whose features have values that put them at the boundaries of the UE core of the cluster. In the context where IPTs are borrowers, the PEs of a cluster are non-defaulting borrowers that had bureau data, lending entity data and borrower data similar to the UEs that belong to the UE core of the cluster.

Having identified both the UEs and PEs of a cluster, it is important to know how the PEs of the cluster differ from the UEs of the cluster, because those differences may be strong indicators for predicting whether a future IPT that falls into the cluster will be a UE or a PE. For example, in a cluster of similarly-situated borrowers, it is important for a lending entity to know what attributes best distinguish the borrowers that defaulted on their loans (the UEs at the core of a cluster) from similar borrowers that did not default on their loans (the boundary PEs of the cluster). When tuned based on this information, the automated prediction mechanism used by a lending entity will be better able to predict whether future borrowers whose data is similar to the IPTs of a cluster will default. Thus, techniques are also provided for identifying the input parameters whose values best distinguish the UE members of a cluster from the PEs that are at the boundaries of the cluster. Those input parameters are referred to herein as DIFF-SET of the cluster.

For each variable in a DIFF-SET, a value range may be determined, where members of the UE core have values for the DIFF-SET variable that fall within the range, and PEs that border the UE core have values for the DIFF-SET variable that fall outside the range. The UE clusters, their boundary PEs, and the DIFF-SET ranges may then be used to improve the accuracy of future predictions.

For example, assume that category B36 is "underperforming" because several borrowers that were categorized as B36 have defaulted on their loans. The borrowers within the B36 may include (a) UE borrowers (borrowers that have defaulted), and (b) PE borrowers (borrowers that have not defaulted). Under these conditions, it may still be desirable to extend a loan to a potential borrower that falls into category B36 when that borrower's DIFF-SET variable values fall outside the DIFF-SET variable ranges associated with the UEs that belong to B36.

Distances Between Individual Prediction Targets (IPTs)

As mentioned above, techniques are described herein for identifying clusters of IPTs. In order to cluster IPTs, it is necessary to have a mechanism for calculating "distances" between IPTs. Various techniques may be used to calculate distances between IPTs, and the cluster identification techniques described herein are not limited to any particular technique for calculating distances between IPTs.

For the purpose of explanation, it shall be assumed that the automated prediction mechanism is used by a lending entity, and the IPTs are individual borrowers. However, the techniques described herein are not limited to any particular type of automated prediction mechanism, nor any particular type of IPT.

According to one embodiment, preliminary steps for determining distances between IPTs include (a) preparing the data of each IPT, (b) normalizing the data, and (c) feature engineering/labeling the data. In one embodiment, these steps are used to produce a "deep-credit-feature" for each IPT. Once the deep-credit-feature for each IPT has been generated, the distance between any two IPTs may be calculated using the formula 200 illustrated in FIG. 2. Each of these steps shall be described in greater detail hereafter.

Preparing the Data of an IPT

As mentioned above, when the automated prediction mechanism is for a lending entity, the input data may include bureau data, lending entity calculated data, and borrower data. According to one embodiment, preparing the data of an IPT under these circumstances involves:

for a first dimension: concatenating the bureau data; and
for a second dimension: concatenating the lending entity calculated attributes and the borrower provided attributes together.

When performing such concatenations, the data order is important and has to be consistent across entire data space. Preferable, the sizes of the final two dimensions are the same. To achieve this, the data can be padded (e.g. repeating some data items considered to be important by domain experts) so that the dimensions match in size.

After a composite attribute value has been made for each of the two dimensions in this manner, the composite attribute values may be normalized. For example, a simple standardization can be used to normalize across data space for each parameter: P=(value−mean)/(standard deviation).

Feature Engineering and Labeling

Clusters are created relative to a population of IPTs. According to one embodiment, the population of IPTs for which clusters are formed are IPTs that were initially categorized based on a particular version of an automated prediction mechanism. For example, in the context of a lending entity, a population from which clusters are formed may include all borrowers that were extended loans under credit model version 85.

After loans have been extended under a version of the credit model, performance of the loans is tracked. Based on the performance information thus obtained, each IPT is labelled as either a performant entity (PE) or an under-performing entity (UE). The criteria used to label the IPTs in this manner may vary from implementation to implementation. For example, in the context of loans, any loan for which payment is delinquent may be labelled a UE, while any loan for which payment was never delinquent is labelled a PE.

Generating a "Deep-Credit" Feature

The number of raw and derived features for each IPT may be very large. For example, when the IPTs are borrowers, the features that characterize each borrower may include 1024 features from the bureau data, and 1024 features from the combination of lending entity data and borrower data.

Figure 2:
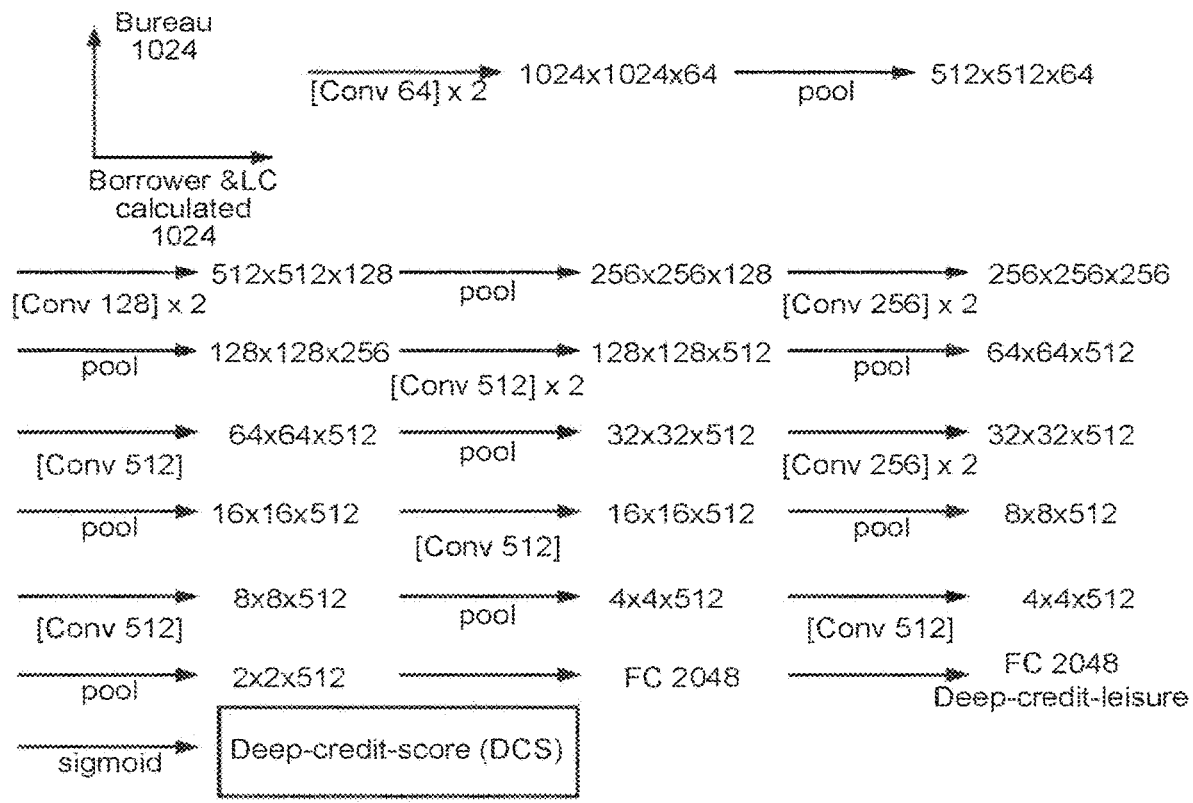
FIG. 2 illustrates a technique for identifying clusters of similarly situated (UEs), along with their boundary PEs.

According to one embodiment, the number of features considered for each IPT is reduced by convoluting the features into a single "deep-credit feature". The convolutions indicated by reference label 204 in FIG. 2 illustrate how the input features for a given borrower, which may include 1024 bureau-supplied attributes and 1024 lending-entity-derived attributes (reference 206), may be combined and convoluted into a "deep-credit feature" (reference 208) that includes 2048 attribute values. In such an embodiment, formula 200 may be used to calculate the distance between two IPTs (A and N) based on the deep-credit features of the two IPTs.

Generating a "Deep-Credit" Score

Various credit score generating mechanisms are used by lending entities to determine the credit worthiness of potential borrowers. According to an embodiment, the techniques described herein make use of a credit score generating mechanism that generates a "deep-credit score" for a potential borrower based on the deep-credit feature of the potential borrower. The deep-credit score may be a sigmoid function. How the deep-credit score may be used to fine-tune an automated prediction mechanism to produce more accurate results shall be described in greater detail hereafter.

UE Cluster Formation—Phase One

According to one embodiment, UE cluster formation is performed in two phases. During the first phase, for each UE, the closest PEs are identified. The set of PEs that are closest to a UE are referred to as the "boundary PEs" of the UE.

For example, assume that the population includes 10,000 loans, and that 100 of the loans are delinquent. Thus, the population of IPTs includes 100 UEs and 9900 PEs. Under these circumstances, during the first phase of UE cluster formation, for each of the 100 UEs, the boundary PEs (of the 9900 PEs) would be identified.

Referring to FIG. 1, it illustrates how a neural network may be used to perform phase one of the cluster formation process, according to an embodiment. In FIG. 1, the UEs are referred to as Ps (because they were found to be "positive" when tested for underperformance). PEs are referred to as Ns (because they were found to be "negative" when tested for underperformance). As illustrated, the dataset of boundary Ns are chosen for each P.

In the illustrated embodiment, domain experts hand-pick a small set of parameters (e.g. FICO, G5 score, EDQ score, etc) and use a simple binary classification neural network to choose the dataset of N and P by closeness to each given P.

As illustrated in FIG. 1, Solution Algorithm 1 comprises the following steps: To choose a dataset of dose Negative (N), based on Positive (P) of the whole under-performance loan population for a given policy version, e.g. 30-day delinquent in MOB6 of PL v80. For efficiency, domain experts hand-pick a small set of parameters (e.g. FICO, G5 score, EDQ score, DTI1, etc.) with a simple binary classification Neural Network: to choose dataset of N and P by the closeness to each given anchor.

UE Cluster Formation—Phase Two

During phase 2 of the cluster formation process, for each UE, it is determined which other UEs belong to its cluster. Continuing with the example given above, one of the 100 UEs will be selected as an "anchor". Then it will be determined which other UEs are closer to the anchor UE than the boundary PEs are to the anchor UE. This may involve, for example, calculating the distance from the anchor UE to each of the other 99 UEs. Those UEs whose distance from the anchor UE is less than the shortest distance of between the anchor UE and any boundary PE are considered part of the anchor UE's cluster. This process is repeated for each UE in the population.

Referring to FIG. 2, "A" refers to the UE that is currently being tested as the anchor of a cluster, and "N" refers to a PE that is close to "A" (as determined during the first phase described above). D(A, P) is the distance between the anchor (A) and another underperforming entity UE (P). For the other underperforming entity UE (P) to be in the cluster of anchor (A), the distance between the anchor (A) and the other UE must be less than the distance D(A,N) between the anchor (A) and the PE (N) that is close to anchor UE (A).

As illustrated in FIG. 2, Solution Algorithm 2 comprises the following steps: training on CNN with triplets lost and automatically forming clusters with Anchor dataset (A), Positive (P), so that: 0<[D(A, N)−D(A, P)]<alpha1<alpha2. Anchor alternates in the whole under-performing population of given policy version.

Cluster Examples

Figure 3:
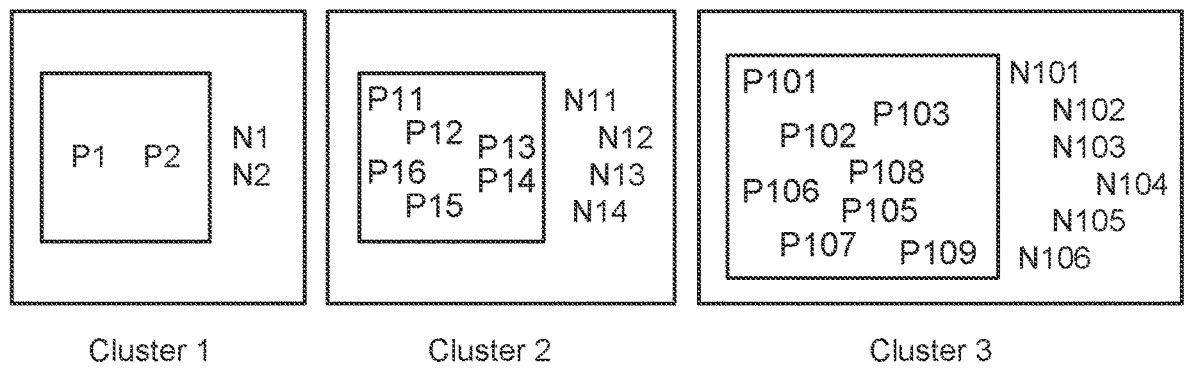
FIG. 3 illustrates three clusters that may result from performing the techniques illustrated in FIGS. 1 and 2.

Referring to FIG. 3, it is an example of clusters that may result from performing the UE cluster formation steps described above. In FIG. 3, three clusters have been formed. The first cluster contains two UEs (P1 and P2) and two boundary PEs (N1 and N2). Boundary PEs N1 and N2 are PEs that are closest to the UEs in cluster 1.

Continuing with the loan example, P1 and P2 may correspond to two loans that are delinquent, where the borrowers of those two loans were similarly situated (e.g. had similar bureau data, similar lending entity data, and similar borrower data). N1 and N2 represent loans that are not delinquent, where the borrowers of loans N1 and N2 had similar attributes to the borrowers that correspond to loans P1 and P2.

Cluster 2 includes six UEs (P11, P12, P13, P14, P15, P16) and four boundary PEs (N11, N12, N13, and N14). Cluster 3 includes eight UEs (P101, P102, P103, P105, P106, P107, P108, P109) and six boundary PEs (N101, N102, N103, N104, N105 and N106).

Visibility into Under-Performing Loans

Once clusters have been formed from a population of IPTs, the information about the clusters can be used in a variety of ways. For example, a visual display may be generated showing each cluster. Such a display is illustrated in FIG. 5.

Figure 5:
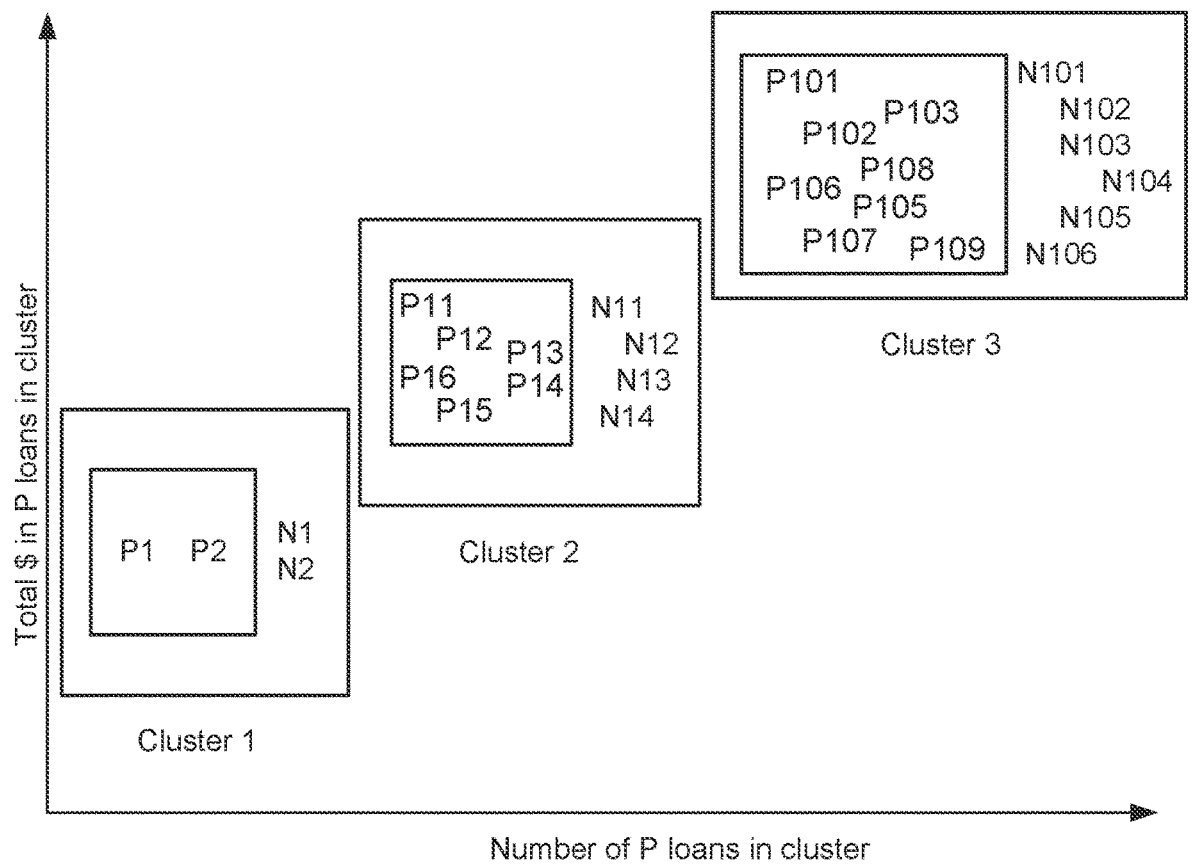
FIG. 5 is an example of how the clusters may be visually presented to assist in identifying the magnitude of the problem represented by the UEs of the respective clusters.

Referring to FIG. 5, the clusters are displayed on a graph. The graph has a vertical axis that corresponds to the total dollar amount of all loans in a cluster. The graph has a horizontal axis that corresponds to the number of Ps (i.e. UEs or "underperforming entities") in the cluster. In the illustrated example, the graphical display illustrated in FIG. 3 allows one to clearly see that fixing the problem that leads to the underperforming loans in cluster 3 is more important than fixing the problem that leads to the underperforming loans in clusters 1 and 2 because cluster 3 corresponds to both more loaned money and more underperforming loans than either cluster 1 or 2.

Diff-Set Formation

The cluster information may be used to figure out (a) which input variables best distinguish between the UEs of a cluster and the boundary PEs of the same cluster, and (b) the value range that the UEs of the cluster have for those variables. The input variables that best distinguish between the UEs of a cluster and the boundary PEs of the same cluster are referred to herein as the "DIFF-SET" of the cluster. The range of values that the UEs of a cluster have for a given DIFF-SET variable is referred to herein as the "critical range" for the DIFF-SET variable.

Referring to FIG. 4, it illustrates an algorithm 400 for determining a DIFF-SET for each cluster. As an example from the algorithm in FIG. 4, the DIFF-SET of the cluster includes the following three DIFF-SET variables, with their corresponding critical ranges:

Bureau_AT104S (critical range: 0.787 to 0.901).
LC-TTRTCB9PL000 (critical range: 0.408 to 0.410)
Borrower_DESIRED_AMNT_TO_INCOME_RATIO
    (critical range: 0.750-1.250)

For the purpose of explanation, assume that the above-listed DIFF-SET is the DIFF-SET for cluster 2, illustrated in FIG. 3. Based on this assumption, the UEs of cluster 2 (i.e. P11, P12, P13, P14, P15 and P16) all have values for variable Bureau_AT104S that fall within the range 0.787 to 901, and all boundary PEs for cluster 2 (i.e. N11, N12, N13 and N14) have values for the variable Bureau_AT104S that fall outside the range 0.787 to 901. Similarly, the UEs of cluster 2 all have values for variable LC-TTRTCB9PL000 that fall within the range 0.408 to 0.410, and all boundary PEs for cluster 2 have values for the variable LC-TTRTCB9PL000 that fall outside the range 0.408 to 0.410. Finally, the UEs of cluster 2 all have values for variable Borrower_DESIRED_AMNT_TO_INCOME_RATIO that fall within the range 0.750-1.250, and all boundary PEs for cluster 2 have values for the variable Borrower_DESIRED_AMNT_TO_INCOME_RATIO that fall outside the range 0.750-1.250.

Different clusters may have different DIFF-SETs. Even when the same variable is in the DIFF-SET of two different clusters, the critical range for the variable may be different for each cluster. Thus, the variable Bureau_AT104S may also be in the DIFF-SET for cluster 3 of FIG. 3. However, the critical range for Bureau_AT104S may be different than the critical range (0.787 to 901) of Bureau_AT104S for cluster 2.

Once the DIFF-SET variables of a cluster and the corresponding critical ranges have been determined, those critical ranges may be used to distinguish between (a) future potential borrowers that are more closely resemble the UEs of the cluster, and (b) future potential borrowers that more closely resemble the PEs of the cluster. Specifically, future potential borrowers whose DIFF-SET parameter values are similar to those of previous borrowers that defaulted (which correspond to the UEs of the cluster) are presumed to have a higher risk of defaulting. Conversely, future potential borrowers whose DIFF-SET parameter values are similar to those of previous borrowers that did not default (which correspond to the PEs of the cluster) are presumed to have a lower risk of defaulting.

Using Diff-Sets and Deep-Credit-Scores to Modify the Automated Prediction Mechanism As mentioned above, attempts have been made to use information about the performance of loans to update and improve the automated prediction mechanisms used by lending entities. However, such "improvements" typically involved identifying categories of loans that were underperforming (e.g. B36 loans), and adjusting how certain input parameters (e.g. G5 scores) were calculated. As mentioned above, those adjustments did not take into account that the underperforming category may include many performant entities PEs. Since it did not account for the existence of PEs within an underperforming category, it had no way to take into account the differences between the PEs and the UEs within the underperforming category. In contrast, having identified the DIFF-SET variables for a cluster, and the critical ranges of each of the DIFF-SET variables, fine-granularity improvements may be made to the automated prediction mechanism.

Figure 6:
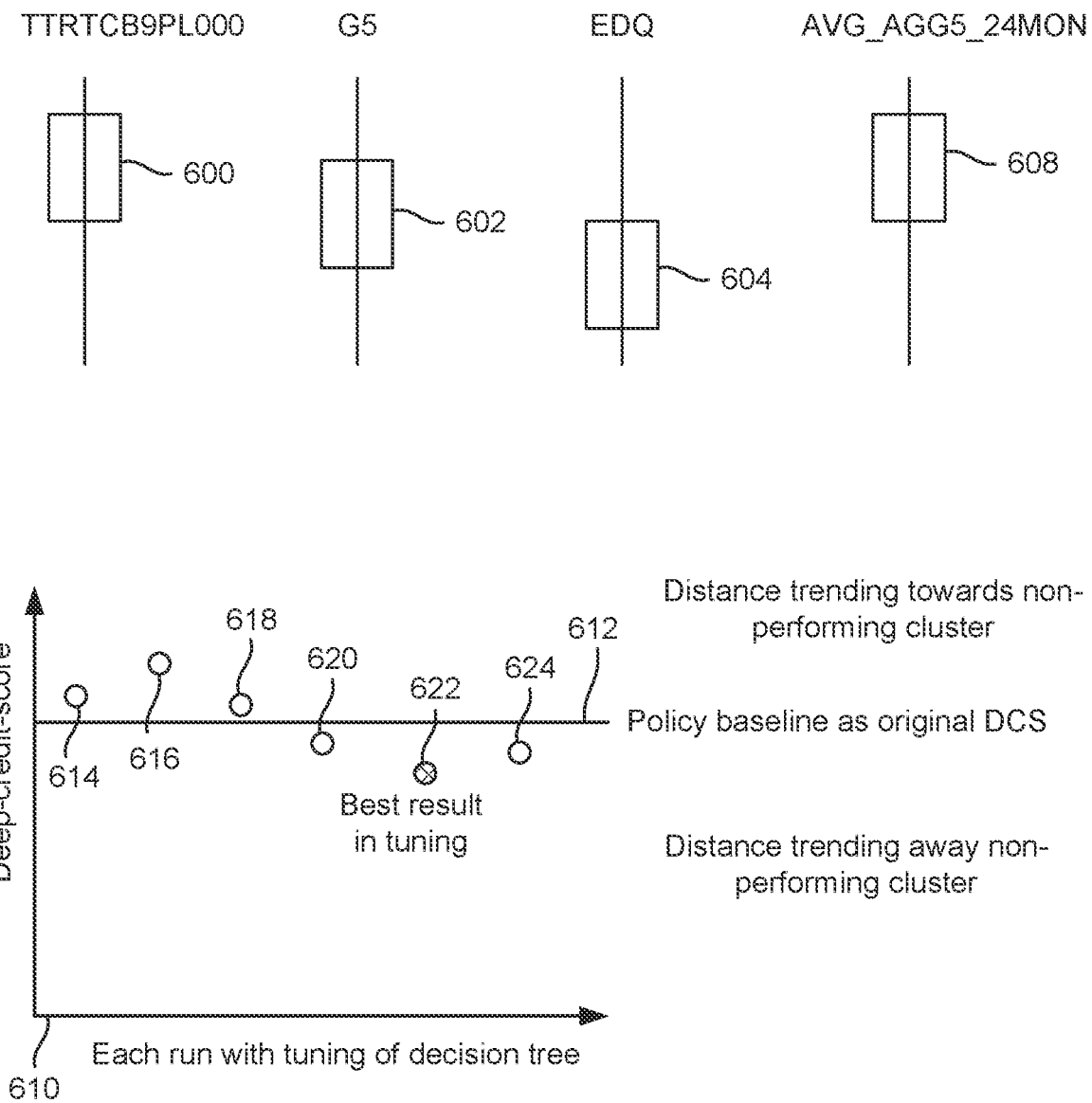
FIG. 6 illustrates a user interface for tuning a credit policy to increase the accuracy of automated predictions, where the tuning is based on clusters, the DIFF-SETs, and critical ranges.

Referring to FIG. 6, it is a block diagram illustrating how DIFF-SETs and DEEP-CREDIT-SCORES may be used to fine-tune an automated prediction mechanism. In particular, the user interface illustrated in FIG. 6 provides help on various what-if scenarios to guide those responsible for making adjustments to the automated prediction mechanism ("policy authors") to adjust the decision tree used by the automated prediction mechanism according to the DIFF-SET to validate proposed policy changes with existing loan information.

In the example illustrated in FIG. 6, fine-tuning is being performed based on a cluster whose DIFF-SET included the variables TTRTCB9PL000, G5, EDQ and AVG_AGG5_24MON. Slider controls 600, 602, 604 and 606 correspond to these DIFF-SET variables. Each slider may be adjusted to select a value for the corresponding DIFF-SET variable. For example, slider 600 may be adjusted to select a value for the variable TTRTCB9PL000.

According to one embodiment, the range for the values that may be selected by a slider is dictated by the critical range of the corresponding DIFF-SET variable for the cluster in question. For example, assume that the DIFF-SET variables for cluster 3 (illustrated in FIG. 3) are TTRTCB9PL000, G5, EDQ and AVG_AGG5_24MON. Assume further that, for cluster 3, the critical range of the variable TTRTCB9PL000 is 0.500 to 0.600. Under these circumstances, when tuning the automated prediction mechanism based on cluster 3, the value range for TTRTCB9PL000 that is selectable by slider 600 may be 0.500 to 0.600.

A chart 610 illustrates the effect, on the deep-credit-scores of the UEs of a cluster, of changing the portion of the credit policy (the automated prediction mechanism) that corresponds to the DIFF-SET variables of a cluster. For the purpose of explanation, it shall be assumed that the UE in question is the anchor of cluster 3. The policy baseline 612 indicates the deep-credit-score produced by the anchor's deep-credit-attribute before any adjustments are made to the credit policy. In the illustrated example, six different adjustments to credit policy were tested. Each test results in a change to the deep-credit-scores produced by the deep-credit-attributes of the UEs that belong to cluster 3. Specifically, the first three tests resulted in deep-credit-scores 614, 616 and 618 that are higher than the deep-credit-score produced by the unadjusted credit policy. The second three tests resulted in deep-credit-scores 620, 622 and 624 that were lower than the deep-credit-score produced by the unadjusted credit policy.

Because it is known that the anchor corresponds to a cluster of UEs (e.g. underperforming loans), it is desirable to adjust the policy in a way that will produce a lower (less favorable) deep-credit-score for the deep-credit-feature of the anchor. After such adjustments to the policy, it is less likely that loans will be extended to potential borrowers that have deep-credit-attributes that are similar to the deep-credit-attributes of the borrower represented by the anchor, because those potential borrowers will have lower credit scores under the adjusted policy. Further, the reduction in their deep-credit-scores will be directly attributable to the closeness of their DIFF-SET variable values to the DIFF-SET variable values of the anchor, since that is the portion of the credit policy that was adjusted. Based on chart 610, the policy adjustments that produced deep-credit-scores 622 produce the best outcome, so those adjustments may be made to thereby produce a new and more accurate version of the automated prediction mechanism.

Identifying Close-to-Anchor Entities

As explained above, identifying clusters of UEs and boundary PEs in a pre-existing population of IPTs can help fine-tune automated prediction mechanisms. In addition, those clusters can be used to identify potentially problematic future borrowers. A potentially problematic future borrower may be, for example, any borrower that is "close" to the anchor of any cluster. In this context, a potential borrower may be considered "close" to an anchor if the distance between the potential borrower and the anchor (as measured by a formula such as formula 200 in FIG. 2) is less than a particular threshold.

For example, assume that that the techniques described herein have been used to create clusters for a population of 10000 past borrowers, all of whom were extended loans based on a credit policy version 85. Assume further credit policy version 85 indicates that a loan should be extended to a new potential borrower. Before issuing such a loan, the lending entity may calculate the distance between (a) the deep-credit-attribute of the new loan applicant and (b) the deep-credit-attributes of each of the anchors of the three clusters. If the deep-credit-attribute of the new loan applicant is within some threshold distance of any of the three anchors, then the new loan applicant may be flagged as a potentially problematic borrower. Borrowers flagged in this manner may be subject to additional scrutiny, or given inferior loan terms, because they are situated similar to prior borrowers that have defaulted.

Using Clusters to Improve Loan Servicing

In addition to helping lending entities make more accurate predictions about new loan applicants, generating clusters using the techniques described herein may also improve the servicing of loans that have already been extended. For example, for each already-extended loan, the lending entity may periodically (e.g. monthly) recompute a deep-credit-feature for the loan based on newly-acquired bureau data, lending entity data, and borrower data. The lending entity may then calculate the distance between the new deep-credit-feature and the deep-credit-feature of the anchor of the closest cluster. That distance can be compared to what the distance was in previous iterations. If the distance is increasing, then the borrower is becoming less like the UE borrowers of the closest cluster, and therefore less likely to default. When this is the case, the lending entity may reward the borrower in some way, or simply congratulate or encourage the borrower.

On the other hand, if the distance between a borrower's new deep-credit-feature and the deep-credit-feature of the anchor of the closest cluster is decreasing, the lending entity may take remedial measures. For example, the lending entity may contact the borrower to see how to best assist the borrower to meet the borrower's obligations. Whether remedial measures are taken, and what the remedial measures are, may hinge on how close the borrower's new deep-credit-feature is to the anchor of the closest cluster.

In a similar manner, the effectiveness of programs can be measured based on whether newly-calculated deep-credit features are trending towards or away from the deep-credit features of the borrowers that correspond to the UE cores of the clusters. For example, after two months of a particular incentive program, if the distance between (a) the deep-credit features of the borrowers targeted by the program, and (b) the deep-credit features of the UE anchors is increasing, then the program may be considered successful. However, if the distance does not increase, or if it decreases, then the efficacy of the program is suspect.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
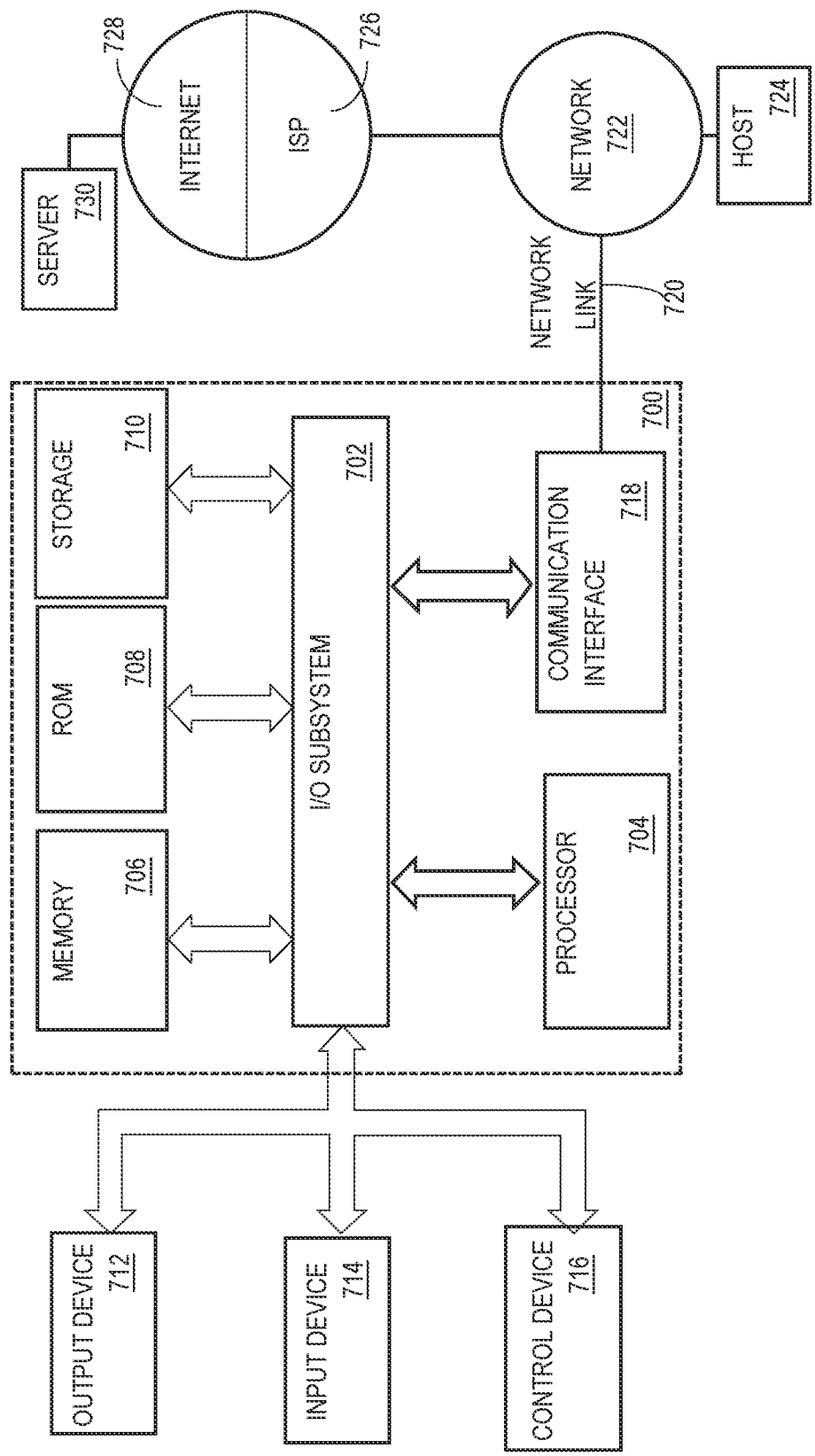
FIG. 7 is a block diagram of a computer system that may be programmed to execute the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for enhancing the accuracy of an automated prediction mechanism, comprising:
    generating initial predictions for a population of individual prediction targets using a plurality of input parameters;
    for each individual prediction target in the population of individual prediction targets, obtaining actual performance data;
    identifying erroneous predictions by comparing initial predictions with actual performance data;
    generating, by one or more computing devices, a feature representation for each individual prediction target by applying a trained neural network to the input parameters;
    calculating pairwise distances between individual prediction targets using the feature representations;
    forming one or more clusters of individual prediction targets based on the pairwise distances, each cluster comprising:
        a core set of underperforming entities that are individual prediction targets associated with erroneous predictions in the initial predictions, wherein the pairwise distances between the underperforming entities in the core set are shorter than the average distances between the underperforming entities and other prediction targets; and
        a boundary set of performing entities that are individual prediction targets associated with accurate predictions in the initial predictions, and positioned in the periphery of the core set;
    identifying at least one input parameter that differentiates the core set from the boundary set within each cluster;
    determining a critical value range for each identified input parameter, wherein values for the core set fall within the critical range, and values for the boundary set fall outside the critical range;
    modifying, by the one or more computing devices, a decision-making threshold or a model parameter of the automated prediction mechanism based on the identified input parameters and corresponding critical value ranges;
    wherein the method is performed by the one or more computing devices.

2. The method of claim 1, further comprising updating the automated prediction mechanism by adjusting its processing of input parameters based on the identified critical value ranges to reduce future erroneous predictions.

3. The method of claim 1, wherein the input parameters include data from external bureaus and internally calculated metrics.

4. The method of claim 1, wherein calculating pairwise distances involves applying a convolution of external bureau data and internal metrics to generate feature vectors for each individual prediction target.

5. The method of claim 1, further comprising:
    receiving information about a new individual prediction target;
    calculating distances between the new target and members of the core set within relevant clusters; and
    assessing the performance risk of the new target based on its proximity to the core set and the critical value ranges.

6. The method of claim 5, wherein the assessed performance risk informs adjustments to the initial prediction for the new individual prediction target.

7. The method of claim 1, further comprising generating a visual representation of the clusters, highlighting the relative significance of each cluster based on the proportion of underperforming entities and associated input parameter values.

8. The method of claim 1, further comprising monitoring individual prediction targets over time to observe changes in their distances from the core set of underperforming entities.

9. The method of claim 1, further comprising:
    generating a visual representation of the clusters, wherein the visual representation highlights:
    the number of underperforming entities in each cluster,
    the total value or performance impact associated with the underperforming entities in each cluster, and
    the relative contribution of each input parameter to the critical value range that differentiates the core set from the boundary set.

10. The method of claim 1, further comprising:
    receiving information about a new individual prediction target;
    determining a similarity score for the new individual prediction target based on:
    the distances between the new individual prediction target and the core set of underperforming entities within one or more clusters, and
    whether the values of the input parameters for the new individual prediction target fall within the critical value ranges of the one or more clusters;

classifying the new individual prediction target based on the similarity score to predict whether the new individual prediction target is more likely to perform or underperform.

11. One or more non-transitory computer readable media comprising instructions which, when executed by one or more hardware processors, cause performance of operations comprising:
generating initial predictions for a population of individual prediction targets using a plurality of input parameters;
for each individual prediction target in the population of individual prediction targets, obtaining actual performance data;
identifying erroneous predictions by comparing initial predictions with actual performance data;
generating, by one or more computing devices, a feature representation for each individual prediction target by applying a trained neural network to the input parameters;
calculating pairwise distances between individual prediction targets using the feature representations;
forming one or more clusters of individual prediction targets based on the pairwise distances, each cluster comprising:
a core set of underperforming entities that are individual prediction targets associated with erroneous predictions in the initial predictions, wherein the pairwise distances between the underperforming entities in the core set are shorter than the average distances between the underperforming entities and other prediction targets; and
a boundary set of performing entities that are individual prediction targets associated with accurate predictions in the initial predictions, and positioned in the periphery of the core set;
identifying at least one input parameter that differentiates the core set from the boundary set within each cluster;
determining a critical value range for each identified input parameter, wherein values for the core set fall within the critical range, and values for the boundary set fall outside the critical range;
modifying, by the one or more computing devices, a decision-making threshold or a model parameter of the automated prediction mechanism based on the identified input parameters and corresponding critical value ranges.

12. The computer readable medium of claim 11, further comprising updating the automated prediction mechanism by adjusting its processing of input parameters based on the identified critical value ranges to reduce future erroneous predictions.

13. The computer readable medium of claim 11, wherein the input parameters include data from external bureaus and internally calculated metrics.

14. The computer readable medium of claim 11, wherein calculating pairwise distances involves applying a convolution of external bureau data and internal metrics to generate feature vectors for each individual prediction target.

15. The computer readable medium of claim 11, further comprising: receiving information about a new individual prediction target; calculating distances between the new target and members of the core set within relevant clusters; and assessing the performance risk of the new target based on its proximity to the core set and the critical value ranges.

16. A system comprising:
at least one device including a hardware processor;
the system being configured to perform operations comprising:
generating initial predictions for a population of individual prediction targets using a plurality of input parameters;
for each individual prediction target in the population of individual prediction targets, obtaining actual performance data;
identifying erroneous predictions by comparing initial predictions with actual performance data;
generating, by one or more computing devices, a feature representation for each individual prediction target by applying a trained neural network to the input parameters;
calculating pairwise distances between individual prediction targets using the feature representations;
forming one or more clusters of individual prediction targets based on the pairwise distances, each cluster comprising:
a core set of underperforming entities that are individual prediction targets associated with erroneous predictions in the initial predictions, wherein the pairwise distances between the underperforming entities in the core set are shorter than the average distances between the underperforming entities and other prediction targets; and
a boundary set of performing entities that are individual prediction targets associated with accurate predictions in the initial predictions, and positioned in the periphery of the core set;
identifying at least one input parameter that differentiates the core set from the boundary set within each cluster;
determining a critical value range for each identified input parameter, wherein values for the core set fall within the critical range, and values for the boundary set fall outside the critical range;
modifying, by the one or more computing devices, a decision-making threshold or a model parameter of the automated prediction mechanism based on the identified input parameters and corresponding critical value ranges.

17. The system of claim 16, further comprising updating the automated prediction mechanism by adjusting its processing of input parameters based on the identified critical value ranges to reduce future erroneous predictions.

18. The system of claim 16, wherein the input parameters include data from external bureaus and internally calculated metrics.

19. The system of claim 16, wherein calculating pairwise distances involves applying a convolution of external bureau data and internal metrics to generate feature vectors for each individual prediction target.

20. The system of claim 16, further comprising:
receiving information about a new individual prediction target;
calculating distances between the new target and members of the core set within relevant clusters; and
assessing the performance risk of the new target based on its proximity to the core set and the critical value ranges.

* * * * *